United States Patent
Fechner et al.

(10) Patent No.: US 7,426,205 B2
(45) Date of Patent: Sep. 16, 2008

(54) NO-ADDRESSING MODULAR-ASSEMBLY ETHERNET SWITCH WITH A G.LINK

(75) Inventors: Kai Fechner, Detmold (DE); Jürgen Jasperneite, Steinheim (DE); Martin Müller, Lëdge (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 767 days.

(21) Appl. No.: 10/688,025

(22) Filed: Oct. 16, 2003

(65) Prior Publication Data

US 2005/0102417 A1    May 12, 2005

(30) Foreign Application Priority Data

Oct. 16, 2002    (DE) ................ 102 48 140

(51) Int. Cl.
*H04L 12/66* (2006.01)
*H04L 12/50* (2006.01)
*H04L 12/28* (2006.01)
*H04L 12/56* (2006.01)
*H04Q 11/00* (2006.01)

(52) U.S. Cl. ............ 370/355; 370/364; 370/388; 370/420

(58) Field of Classification Search ......... 370/229, 370/257, 352, 359, 360, 364, 463, 489, 355, 370/357, 386, 388, 419, 420; 710/31, 33, 710/52

See application file for complete search history.

(56) References Cited

U.S. PATENT DOCUMENTS

| | | | |
|---|---|---|---|
| 5,493,194 A | | 2/1996 | Damiano et al. |
| 5,758,053 A | * | 5/1998 | Takeuchi et al. ............ 714/4 |
| 6,046,999 A | * | 4/2000 | Miki et al. ............ 370/395.52 |
| 6,138,185 A | * | 10/2000 | Nelson et al. ............ 710/33 |
| 6,286,060 B1 | * | 9/2001 | DiGiorgio et al. ............ 710/31 |
| 6,590,417 B1 | * | 7/2003 | Jones et al. ............ 326/39 |
| 6,690,668 B1 | * | 2/2004 | Szczepanek et al. ........ 370/392 |
| 6,804,193 B1 | * | 10/2004 | Dubreuil ............ 370/217 |

FOREIGN PATENT DOCUMENTS

WO    WO 02 41544 A    5/2002

OTHER PUBLICATIONS

"Measurements in Switched Ethernet Networks Used for Automation Systems", Vonnahme, et al., Factory Communications Systems, 2000 IEEE International Workshop on Porto, Portugal Sep. 6-8, 2000.

Hubbs, "A survey of highly integrated Enternet DataComm devices", Aerospace Conference, 1998 IEEE Snowmass at Aspen, Co., USA, Mar. 21-28, 1998, New York, NY, IEEE, US, Mar. 21, 1998.

"10/10/1000 Ethernet: Gallileo Technology Announces Availability of the first Products in The GalNet-II Architecture Family", Edge Working Group Computing Report, Online! Jul. 20, 1998.

European Search Report for EP 03 02 2768, dated Dec. 9, 2003.

* cited by examiner

*Primary Examiner*—Seema S. Rao
*Assistant Examiner*—Leon Andrews

(57) ABSTRACT

An Ethernet switch has a header device with a crossbar device and a number of downstream interface modules with a first number of a series of ports and a second number of a series of ports, respectively, such that in each case the same one in the series of the first number of ports is connected to a switching control unit coupled to an interface device, and the further ports in the series of the first number of ports are connected to a port in the second number of the series of ports via respective data lines routed in cascade form.

15 Claims, 4 Drawing Sheets

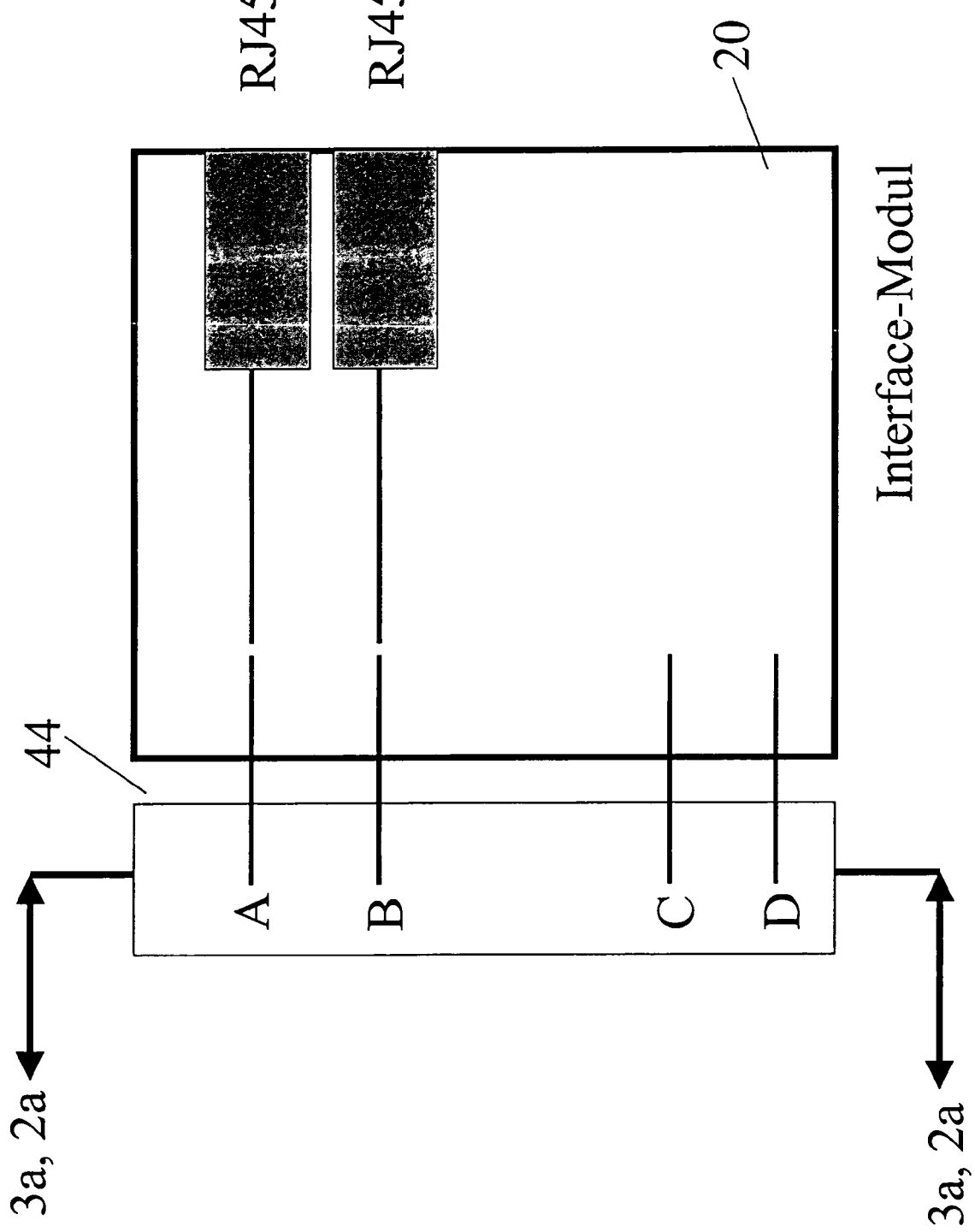

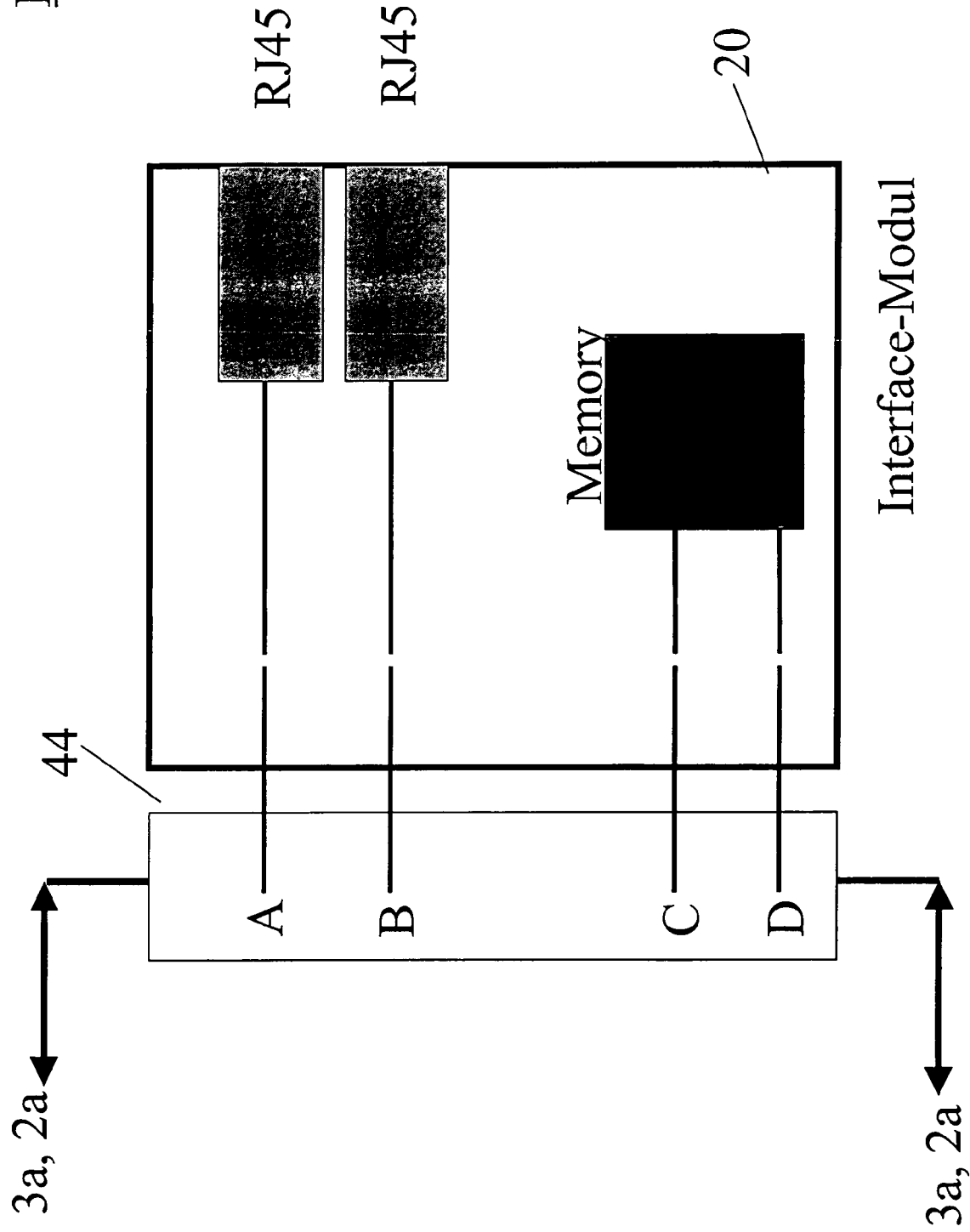

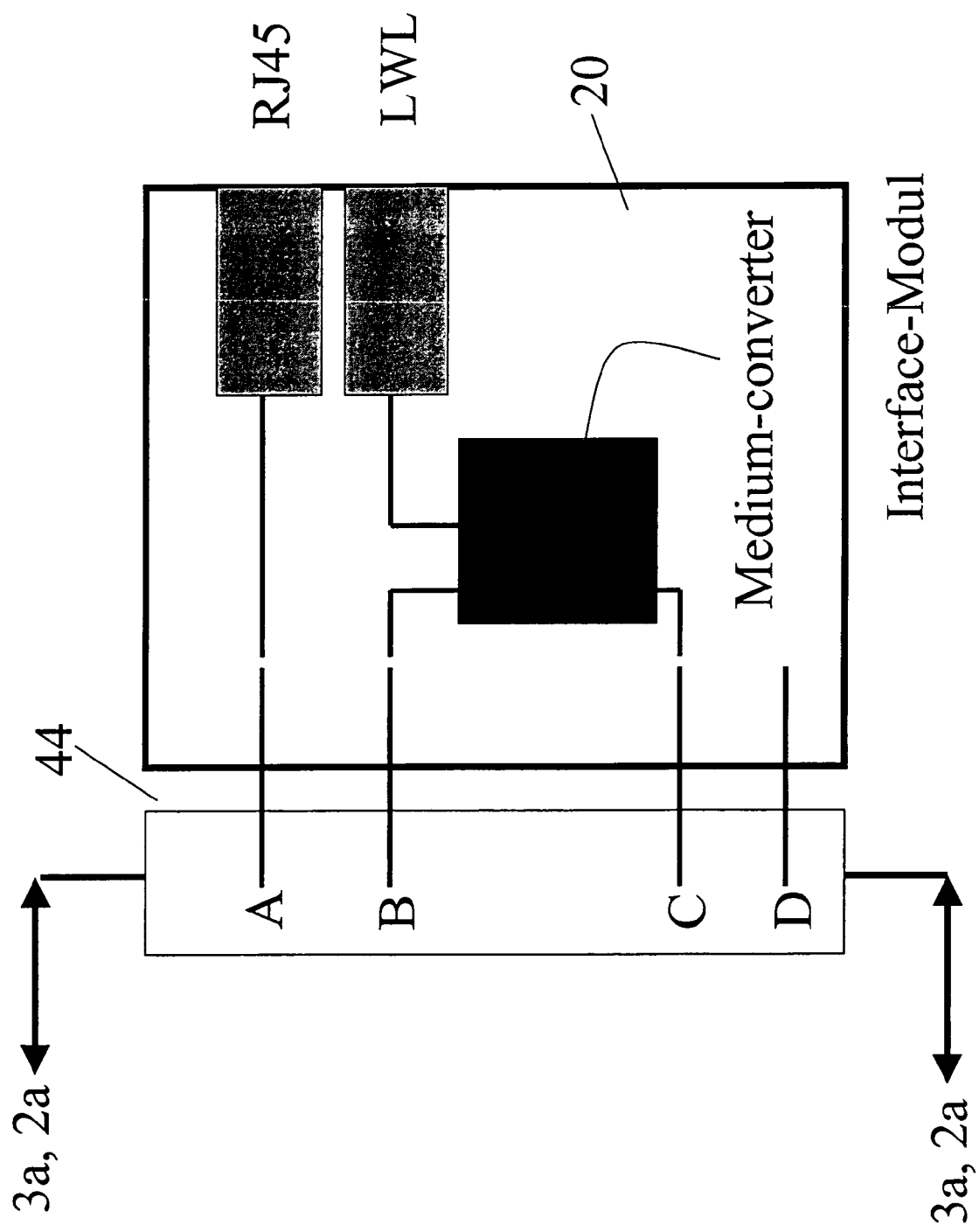

NO-ADDRESSING MODULAR-ASSEMBLY ETHERNET SWITCH WITH A G.LINK

CROSS-REFERENCES TO RELATED APPLICATIONS

Not applicable.

STATEMENT REGARDING FEDERALLY SPONSORED RESEARCH OR DEVELOPMENT

Not applicable.

TECHNICAL FIELD

The invention relates to an interface module for a modular-assembly Ethernet switch, an Ethernet switch of this type and a method for providing a multiplicity of actuatable Ethernet connections on a modular basis.

Particularly in automation technology, communication is undergoing a change. The need for generally standardized and disclosed protocols is growing to an increasing extent as automation progresses and with the associated need for networking a very wide variety of technical units.

The open industrial standard Ethernet is therefore becoming increasingly widespread and allows all-encompassing collaboration between the different networks, with the remote control, remote maintenance and/or remote sensor technology as far as the machine tool being made possible by TCP/IP, which can be transported using said Ethernet.

RELEVANT PRIOR ART

A fundamental component of such Ethernet-based networks is formed by switchable active distributors, generally and subsequently called switches, which significantly reduce the probability of collisions between data packets which are to be transmitted by segmenting the networks. At the chip level, fully integrated switches having a multiplicity of connections, "multiport switches", are available today.

These Ethernet switches thus conventionally have a prescribed number of Ethernet interfaces connected to a switching control unit and thus have substantially stipulated physical sizes for implementing particular defined functions. When it is necessary to extend the interfaces, a further cost-intensive and space-absorbing full Ethernet switch is therefore necessary, even if it is not used to the full extent.

In addition, Ethernet switches are known in which a cross-coupling device, a "crossbar", is used to connect a defined number of switching control units having a respective prescribed number of Ethernet interfaces to one another separately by means of a multipole bus line, the "G.Link". In this context, however, corresponding addressing is required between the crossbar and the respective switching control unit in order to ensure desired actuation of the interfaces.

SUMMARY OF THE INVENTION

It is an object of the invention to demonstrate a novel and substantially improved way of substantially precluding the above problems and drawbacks of the prior art and of providing an application-specific Ethernet switch, in particular.

The invention achieves the object by means of an interface device having the following features: An interface module comprising: a first number of a series of ports and a second number of a series of ports, where the first port in the series of the first number of ports is connected by means of at least one data line to a switching control unit connected to an interface, and where the subsequent input ports in the series of the first number of ports are connected in order by means of at least one respective data line to the ports in the series of the second number of ports, starting with the first in the series of the second number of ports.

The invention also provides an Ethernet switch with the following features: a header device with a crossbar device and a number of downstream interface modules, particularly a number of downstream interface modules, having a first number of a series of ports and a second number of a series of ports, respectively, such that in each case the same one in the series of the first number of ports is connected to a switching control unit coupled to an interface device, and the further ports in the series of the first number of ports are connected to a port in the second number of the series of ports by means of respective data lines routed in cascade form.

A method according to the invention provides a multiplicity of switchable Ethernet terminals, where a crossbar device is connected to a multiplicity of separate multipole data lines having switching control units, which can be lined up in modular fashion and are associated with respective Ethernet terminals, by means of a respective predefined data line.

The invention thus provides an interface module having a first number of a series of ports and a second number of a series of ports, where the first port in the series of the first number of ports is connected by means of a data line to a switching control unit which is coupled to an interface device, and where the subsequent ports in the first number of the series of ports are respectively connected in order by means of a data line to the ports in the second number of the series of ports, starting with the first port in the series of the second number of ports.

Such an interface module can be used in a surprisingly simple manner to assemble a switch having a header device, which comprises a crossbar device, and a number of downstream interface modules having a first number of a series of ports and a second number of a series of ports, respectively, such that in each case the same one in the series of the first number of ports is connected to a switching control unit which is coupled to an interface device, particularly an interface device comprising Ethernet interfaces, and the further ports in the first series of the first number of ports are respectively connected to a port in the second number of the series of ports by means of respective data lines, particularly in cascade form.

On account of the thus assured modular provision of a multiplicity of switchable Ethernet terminals, in which a crossbar device having a multiplicity of separate multipole data lines is connected to switching control units, which can be lined up in modular fashion and are associated with respective Ethernet terminals, by means of a respective predefined data line, with each switching control unit preferably being produced as part of an interface module such that information which is to be transmitted to a downstream interface module is routed in cascade form by the respective upstream interface module, specific addressing of the respective interface modules is thus no longer necessary, particularly because all the interface modules are of the same design and the respective addressing is defined appropriately by the interconnection of the individual interface modules.

Furthermore, an application-specific physical size is ensured on account of the modular design, which satisfies the need for efficient, space-saving and nevertheless cost-effective solutions, particularly in the industrial sector, for the first time.

A further feature is, if the preferably Ethernet-compatible interfaces, particularly based on the same design of the interface modules, are not defined in advance and hence, a further application specific highly flexible, additional modular variety of use is being enabled. Only by the connection of a respective interface with a specifying interface utilization module the determination of the interface is taken place with regard to a device intended and/or necessary for the further use and/or processing of the signals being provided at the interface. Therefore such interface utilization modules particularly comprise passive modules, for example for providing a conventional RJ-45 jack, active modules, configured for example as a transmission medium converter for connecting an optical beam wave guide and/or for a radio transmission, and modules configured as a (buffer) memory.

In this context, in one embodiment, the bus lines are respectively in the form of separate and multipole bus lines, "G.links", so that transmission of large volumes of data within an interface module is also ensured. Expediently, the crossbar device also comprises a multiplicity of such bus lines, which can be connected in the form of a star to respective switching control units.

In a practical development, the header device also comprises an additional interface device which is connected to the crossbar device by means of a bus line directly, preferably via a switching control unit in the header device.

In addition, in one practical development, the crossbar device comprises a PCI (Programmable Communication Interface) interface for connecting, in particular, a control unit for management functions, such as a CPU. As a result of the data being passed in cascade form through a respective interface module between respective input and output ports, with the ports preferably being designed such that they are suitable both as an input port and an output port, the inventive Ethernet switch can be assembled and/or extended in modular fashion on an application-specific basis. The high-speed bus lines, particularly from the crossbar device, are also arranged serially for simple attribution in one preferred development.

BRIEF DESCRIPTION OF THE DRAWINGS

The invention is described in more detail below using an embodiment of an Ethernet switch in accordance with the invention with reference to the appended drawing, in which:

FIGS. 2, 3 and 4 show schematic block diagrams of exemplar determinations of an Ethernet port by means of different interface utilization modules.

DETAILED DESCRIPTION OF THE INVENTION

Figure 1:
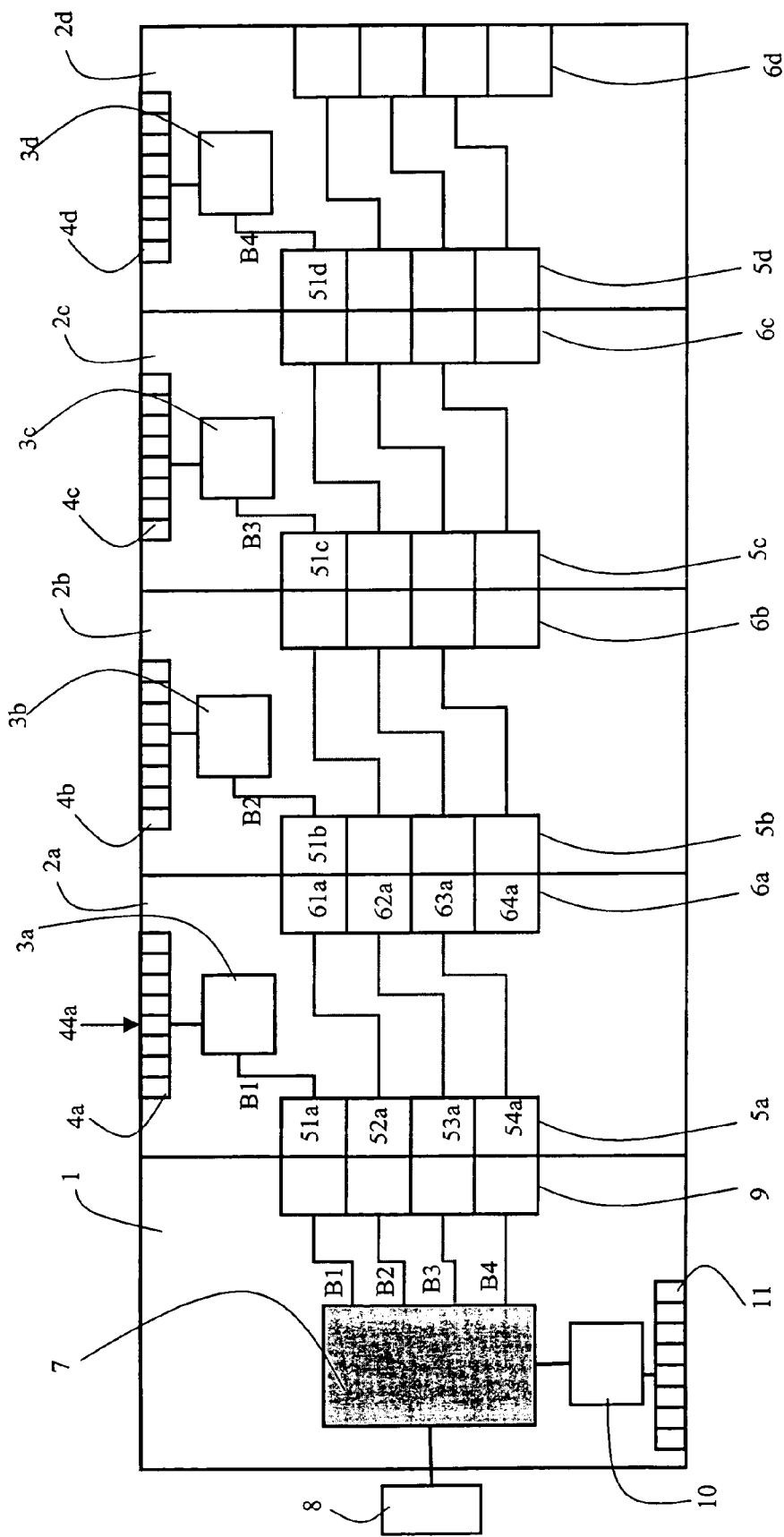
FIG. 1 shows a schematic block diagram of an inventive no-addressing modular-assembly Ethernet switch with a G.Link.

The text below refers to FIG. 1, in particular, which schematically shows an Ethernet switch in accordance with the invention.

The Ethernet switch shown comprises a header station 1 and four interface modules 2a, 2b, 2c and 2d. Each of these interface modules 2a, 2b, 2c and 2d comprises a switching control unit 3a, 3b, 3c and 3d, which are each comprehensibly designed with a prescribed number of Ethernet-compatible interfaces 4a, 4b, 4c and 4d, in the present case with eight Ethernet ports respectively. In FIG. 1, at the interface device 4a one of the eight Ethernet ports is marked with the reference sign 44a.

Each of these ports includes data signals provided according to description below, whereby power supply and control signals are additionally provided. A determination of the individual Ethernet ports with regard to the further use and/or processing of the signals occurs only by the connection of a respective application specific based interface utilization module of a plurality of different interface utilization modules. Such port specifying modules particularly comprise passive modules, for example for providing a conventional RJ-45 jack, active modules, for example as a transmission medium converter for connecting an optical beam wave guide and/or modules constructed as (buffer) memory.

FIGS. 2 to 4 show with regard to an multifunction port 44 of the interface device 4a of the FIG. 1 three different application specific determinations of Ethernet ports 44a by means of specific interface utilization modules being labeled as interface module 20 in FIG. 2 to 4, with the multifunction port 44 containing at least one Ethernet port 44a, according to the present example two Ethernet ports 44a, control signals and a power supply.

The multifunction port 44 includes with regard to the underlying example four integrated multi-core connection terminals A, B, C and D. At the terminals A and B The data signals provided according to the description below are at the terminals A and B, the power supply is at C and via D an additional logic interface is provided by a management device 8 (FIG. 1). Consequently, in FIG. 2 the interface utilization module connected with the multifunction port 44 is providing via the terminals A and B two conventional RJ-45 jacks. Likewise, in FIG. 3 the interface utilization module connected with the multifunction port 44 is providing via the terminals A and B two conventional RJ-45 jacks but is further comprising a memory coupled with the terminals C and D. The interface utilization module connected in FIG. 4 with the multifunction port 44 is providing via the terminal A an RJ-45 jack and is further comprising a transmission medium converter coupled with the terminals B and C, so that in addition to the RJ-45 jack a beam wave guide compatible jack (LWL jack) is provided for coupling a beam wave guide.

Again with reference to FIG. 1, in particular, each interface module 2a, 2b, 2c and 2d is produced with a number of ports 5a, 5b, 5c and 5d, serving as input ports, and a number of ports 6a, 6b, 6c and 6d, serving as output ports. The switching control unit 3a, 3b, 3c and 3d for a respective interface module 2a, 2b, 2c and 2d is connected by means of a data routing connection to the same respective port in a number of input ports 5a, 5b, 5c and 5d on the interface module in question.

In the present case, each switching control unit 3a, 3b, 3c or 3d is connected to the respective first input port 51a, 51b, 51c or 51d by means of a respective separate multipole bus line.

The respective subsequent ports 52, 53 and 54 in the number of input ports 5a, 5b, 5c and 5d are connected to the number of output ports 6a, 6b, 6c and 6d of the respective interface module 2a, 2b, 2c and 2d via a prescribed cascade arrangement.

In the present case, the respective input port 52 arranged at the second position is connected to the first output port 61, the third input port 53 is connected to the second output port 62, and the fourth input port 54 is connected to the third output port 63.

The header station 1 also comprises a cross-coupling device or crossbar 7, which comprises, by way of example, a PCI interface for a management device 8, such as a CPU, which can be connected thereby. The crossbar 7 also has a multiplicity of multipole internal bus lines which are serially connected to at least one output port rail 9 on the header station 1. Conventionally, the crossbar devices 7 in today's prior art provide between four and twelve internal high-speed bus lines or "G.Links". In this context, the input ports 5a, 5b, 5c and 5d on the interface modules 2a, 2b, 2c and 2d are handily matched in appropriate complementary fashion to the output port rail 9 on the header station.

The header station 1 also comprises at least one further dedicated switching control unit 10 which is connected to an interface device 11, chosen appropriately beforehand, in the present case again an interface device comprising eight Ethernet ports, the specification of which are preferably performed in turn only by the connection of an individual interface utilization module.

The crossbar 7 is the superordinate component which is connected to each switching control unit 3a, 3b, 3c and 3d, in each case by means of one of the separate multipole internal bus lines. The input side of the crossbar is conventionally connected to a network component (not shown), such as an upstream cross-coupling device. All the multipole buses or G.Link connections going on from the crossbar 7, which thus provide a more-or-less star-shaped connection for further switching and/or control units and the crossbar 7, are routed by the first interface module 2a in cascade form, with the exception of the bus arranged at the top in FIG. 1, which is connected to the input port 51a. This bus is routed directly to the switching control unit 3a provided in the interface module 2a. The rest of the buses implemented are arranged on the output port rail 6a such that the second bus on the input side becomes the first bus on the output side, the third bus on the input side becomes the second bus on the output side, etc.

The further module 2b connected to the interface module 2a is in turn connected to the switching control unit 3a by means of its top bus connected to the input port 51b.

In other words, the bus arranged in the interface module 2a at the second position on the input side and at the first position on the output side is routed directly to the switching control unit 3b in the interface module 2b.

The other buses are in turn implemented in the interface module 2b in cascade form. Since the design of the individual modules 2a, 2b, 2c, 2d is essentially identical, it corresponds in the manner described above with reference to the interface module 2a.

A result of this is particularly that the first switching control unit 3a in the first interface module 2a is connected to the crossbar 7 by means of the first G.Link connection B1, the second switching control unit 3b in the second interface module 2b and the third and fourth switching control units 3c, 3d in the respective subsequent interface modules 2c, 2d are connected to the second bus B2 from the crossbar 7 and to the respective correspondingly subsequent third and fourth buses B3 and B4 from the crossbar 7.

Additional addressing of the individual interface modules themselves is thus no longer necessary, particularly because this addressing is defined as appropriate by the interconnection of the individual interface modules 2a, 2b, 2c, 2d. All of the interface modules are of the same design and can thus be used handily for input/output stations, particularly in control engineering in the industrial sector, in a space-saving and cost-effective manner.

In this context, the maximum limitation of the inventive Ethernet switch is given via the cross-coupling device 7 on the basis of the provided number of G.Link connections, it being necessary to adjust the number of input and output ports 5a-5d and 6a-6d as appropriate for routing a larger number of bus lines as compared with the number of four bus lines which is shown in FIG. 1.

What is claimed is:

1. An interface module (2a, 2b, 2c, 2d) comprising:
   a first number of a series (5a, 5b, 5c, 5d) of ports (51a, 52a, 53a, 54a, 51b, 51c, 51d) and
   a second number of a series (6a, 6b, 6c, 6d) of ports (61a, 62a, 63a, 64a), where a first port (51a, 51b, 51c, 51d) in the first number oaf series of ports (51a, 52a, 53a, 54a, 51b, 51c, 51d) is connected by means of at least one data line not to any port (61a, 62a, 63a, 64a) in the series of the second number (6a, 6b, 6c, 6d) of ports but to a switching control unit (3a, 3b, 3c, 3d) connected to an interface device (4a, 4b, 4c, 4d), and where the subsequent input ports (52a, 53a, 54a) in the first number of a series (5a, 5b, 5c, 5d) of ports are connected in order by means of at least one respective data line to the ports (61a, 62a, 63a, 64a) in the series of the second number of a series (6a, 6b, 6c, 6d) of ports, starting with a first (61a) in the series of the second number of ports such that the second port (52a) in the series (5a, 5b, 5c, 5d) of the first number of ports is connected only to the first port (61a) in the series of the second number (6a, 6b, 6c, 6d) of ports, the third port (53a) in the series (5a, 5b, 5c, 5d) of the first number of ports is connected only to the second port (62a) in the series of the second number (6a, 6b, 6c, 6d) of ports, and so on.

2. The interface module as claimed in claim 1, where the interface device comprises a number of Ethernet interfaces (4a, 4b, 4c, 4d, 11).

3. The interface module as claimed in claim 1, where a specification of the interfaces of the interface device (4a, 4b, 4c, 4d) is taken place by means of at least interface utilisation module (20) which has to be connected to the interface device.

4. The interface module as claimed in claim 1, where data lines are in the form of separate and multipole bus lines (B1, B2, B3, B4).

5. An Ethernet switch comprising a header device (1) and a number of downstream interface modules (2a, 2b, 2c, 2d), particularly a number of downstream interface modules as claimed in claim 1, the header device (1) includes a crossbar device (7), each of said downstream interface modules has a first number of a series (5a, 5b, 5c, 5d) of ports and a second number of a series (6a, 6b, 6c, 6d) of ports, respectively, such that in each case the same one (51a, 51b, 51c, 51d) in the series of the first number (5a, 5b, 5c, 5d) of ports of one of said modules is connected not to any port (61a, 62a, 63a, 64a) of the second number of a series (6a, 6b, 6c, 6d) of ports of said one of said ports but connected to a switching control unit (3a, 3b, 3c, 3d) coupled to an interface device (4a, 4b, 4c4d), and each of the further ports (52a, 53a, 54a) in the series of the first number (5a, 5b, 5c, 5d) of ports of said one of said module is connected to only one port in the second number (6a, 6b, 6c, 6d) of the series of ports of said one of said module by means of respective data lines routed in cascade form.

6. The Ethernet switch as claimed in claim 5, where the crossbar device (7) comprises a multiplicity of bus lines (B1, B2, B3, B4) which can be connected in a star-shaped form to respective switching control units (3a, 3b, 3c, 3d).

7. The Ethernet switch as claimed in claim 5, where the header device (1) comprises an interface device (11) which is connected to the crossbar device (7) by means of a bus line directly or via a switching control unit (9) in the header device (1).

8. The Ethernet switch as claimed in claim 5, where the interface device comprises a number of Ethernet interfaces (4a, 4b, 4c, 4d, 11).

9. The Ethernet switch as claimed in claim 5, comprising at least one interface utilization module (20) connected to at least one interface device (4a, 4b, 4c, 4d, 11) for the specification of at least one interface (44a).

10. The Ethernet switch as claimed in claim 9, where the interface utilization module (20) is constructed as being an active module, a passive module and/or a (buffer)memory module.

11. The Ethernet switch as claimed in claim 5, where the data lines (B1, B2, B3, B4) are each in the form of separate, multipole G.Link connections.

12. The Ethernet switch as claimed in claim 5, where the crossbar device (7) comprises a PCI interface for connecting a management function device (8).

13. The Ethernet switch as claimed in claim 5, where the design of the Ethernet switch is modular and/or extendable.

14. The Ethernet switch as claimed in claim 5, where the bus lines (B1, B2, B3, B4) are arranged serially.

15. A method, including an interface module (2a, 2b, 2c, 2d) comprising:

a first series (5a, 5b, 5c, 5d) of ports 51a, 52a, 53a, 54a, 51b, 51c, 51d) and a second number of a series (6a, 6b6c, 6d) of ports (61a, 62a, 63a, 64a), where a first port (51a, 51b, 51c, 51d) in the first number of a series of ports (51a, 52a, 53a, 54a, 51b, 51c, 51d) is connected by means of at least one data line not to any port (61a, 62a, 63a, 64a) in the series of the second number (6a, 6b, 6c, 6d) of ports but to a switching control unit (3a, 3b, 3c, 3d) connected to an interface device (4a, 4b, 4c, 4d), and where the subsequent input ports (52a, 53a, 54a) in the first number of a series (5a, 5b, 5c, 5d) of ports are connected in order by means of at least one respective data line to the ports (61a, 62a, 63a, 64a) in the series of the second number of a series (6a, 6b, 6c, 6d) of ports, starting with a first (61a) in the series of the second number of ports such that the second port (52a) in the series (5a, 5b, 5c, 5d) of the first number of ports is connected only to the first port (61a) in the series of the second number (6a, 6b, 6c, 6d) of ports, the third port (53a) in the series (5a, 5b, 5c, 5d) of the first number of ports is connected only to the second port (62a) in the series of the second number (6a, 6b, 6c, 6d) of ports, and so on, in which each switching control unit (3a, 3b, 3c, 3d) is produced as part of an interface module (2a, 2b, 2c, 2d) such that information to be transmitted to a downstream interface module (2b, 2c, 2d) from the crossbar device (7) is routed through the respective upstream interface module (2a, 2b, 2c) in cascade form.

* * * * *